United States Patent [19]

Koliba et al.

[11] 4,200,046

[45] Apr. 29, 1980

[54] CHOCK DEVICE FOR A TRANSPORTER

[75] Inventors: Melvin J. Koliba, Plymouth; Larry P. Napel, Hamburg, both of Mich.

[73] Assignee: General Motors Corporation, Detroit, Mich.

[21] Appl. No.: 965,282

[22] Filed: Dec. 1, 1978

[51] Int. Cl.² .............................................. B60P 7/12
[52] U.S. Cl. .................................................. 410/94
[58] Field of Search ........................... 248/311, 119 S; 296/35 A; 105/463, 368 T, 464, 474, 367, 368

[56] References Cited

U.S. PATENT DOCUMENTS

| | | | |
|---|---|---|---|
| 3,584,824 | 6/1971 | Belier | 248/361 |
| 3,593,387 | 7/1971 | Georgi | 24/221 |
| 3,612,466 | 10/1971 | Arnold | 248/361 |
| 3,752,086 | 8/1973 | Smith | 105/367 |
| 4,010,848 | 3/1977 | Pater et al. | 105/367 |

*Primary Examiner*—Richard A. Bertsch
*Attorney, Agent, or Firm*—Edward J. Biskup

[57] ABSTRACT

A chock device that is releasably connected to a floor supported apertured bar which forms a part of a transporter and includes a lock head that is insertable into a complimentary hole in the bar and can be rotated into a locked position after which the lock head is raised upwardly by an axially movable wedge member so as to maintain the chock device in firm engagement with the bar.

3 Claims, 8 Drawing Figures

CHOCK DEVICE FOR A TRANSPORTER

This invention relates to restraint devices in general and more particularly concerns a chock device that can be releasably connected to the floor portion of a transporter for preventing cargo from shifting while the transporter is moving.

Co-pending patent application United States Ser. No. 965,237, filed on Dec. 1, 1978 and entitled, "Chock Device For A Transporter", in the names of Melvin J. Koliba, Larry P. Napel and Clarence D. Oakes, discloses a chock device adapted to be fixedly connected to an elongated bar secured to the floor portion of a transporter for maintaining cargo in a fixed position while the transporter is in transit. The bar is formed with a plurality of oblong holes and the chock device has a body portion which includes an upright member for engaging the cargo and a rigidly connected horizontal member which is adapted to overlie the bar. The bottom portion of the horizontal member rigidly carries a projection having a cross-sectional configuration which corresponds to the configuration of the holes in the bar so as to allow the projection to be selectively located in one of the holes and substantially fill the latter. In addition, a rotatable lock member has a lock head that extends through the horizontal member and is adapted to register with and be located in another of the holes in the bar when the horizontal member is positioned onto the bar. The lock head has an elliptical shape which allows it to pass through the accommodating hole in the bar and prevents it from being removed from the bar when it is rotated approximately 90°. Rotatable cam means are also provided for moving the lock head towards the horizontal member so when the lock head is in the raised locked position, it serves to maintain the body portion in a fixed relationship with respect to the bar.

The present invention concerns a chock device of the type described above but an improvement thereover in that the body portion, which includes the upright member for engagement with the cargo and the horizontal member for overlying the fixed apertured bar in the floor portion, is provided with a wedge that is supported for axial movement along the horizontal member for raising the lock head into locking engagement with the bar. A lever is connected to the wedge for not only providing axial movement of the wedge but also for pivoting the wedge in opposite directions about the center axis of the lock member so as to facilitate retraction of the wedge in a case where the lock head may be in binding contact with the bar due to the cargo shifting against the upright member. In addition, a pivoted U-shaped lever is carried by the body portion that serves the dual function of a handle for the chock device so as to allow the latter to be carried from one location to another, and also acts as a blocking member which maintains both the wedge lever and the lock head lever in locked positions when the chock device is attached to the bar.

The objects of the present invention are to provide a new and improved chock device that is releasably connected to a floor supported apertured bar which forms a part of a transporter and includes a lock head that is insertable into a complimentary hole in the bar and can be rotated in a locked position after which the lock head is raised upwardly by an axially movable wedge member so as to maintain the chock device in firm engagement with the bar; to provide a new and improved chock device having a body portion provided with a rotatable lock head that cooperates with at least one projection fixed to the body portion for securing and positioning the chock device in an apertured support bar fixed with the floor of a transporter; to provide a new and improved chock device having a lock head which is maintained in a raised position by a wedge member for firmly connecting the chock device to an apertured floor of a transporter and in which the lock head is lowered in position when the wedge is retracted so as to facilitate removal of the chock device from the floor; to provide a new and improved chock device for a transporter that is adapted to be connected to a floor supported elongated bar having a plurality of uniformly spaced and identical holes and that includes a lock head rotatably supported in a body portion which comprises an upright member for engaging cargo and a horizontal member provided with a plurality of fixed projections which together with the lock head are adapted to extend into longitudinally spaced holes in the bar for locating and fixing the chock device to the floor of the transporter; and to provide a new and improved chock device having a wedge member supported for axial and pivotal movement for raising and lowering a rotatable lock head and thereby facilitating the securement and removal of the chock device from an apertured floor in a transporter and in which the body portion of the chock device is provided with a pivoted handle which serves to prevent movement of a lever connected to the wedge member when the lock head is in the raised position.

Other objects and advantages of the present invention will be more apparent from the following detailed description when taken with the drawings in which.

Figure 3:
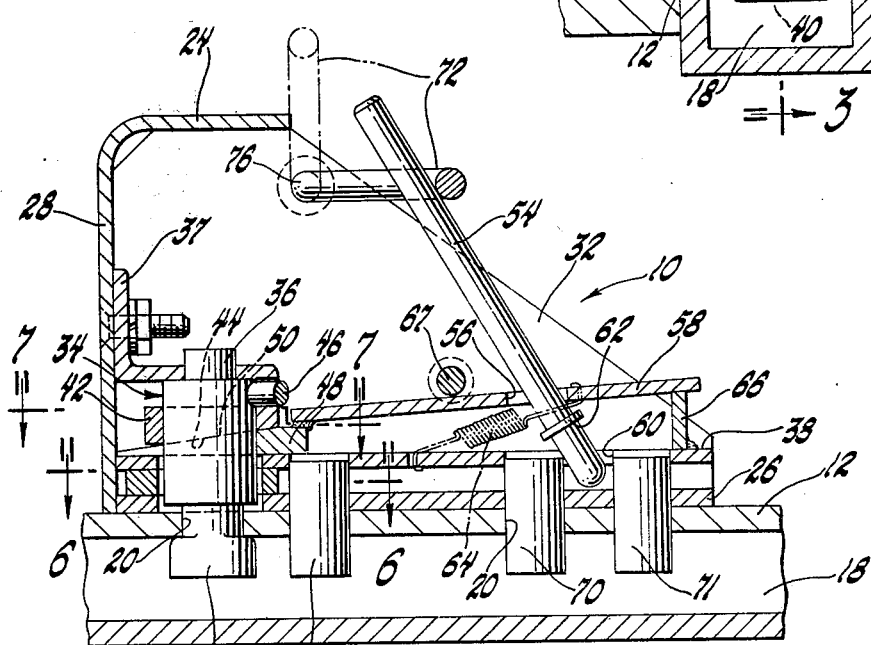
FIG. 3 is a sectional side view of the chock device taken on lines 3—3 of FIG. 2 showing the lock head rotated to the locked position and with the wedge member positioned for raising the lock head.
Figure 4:
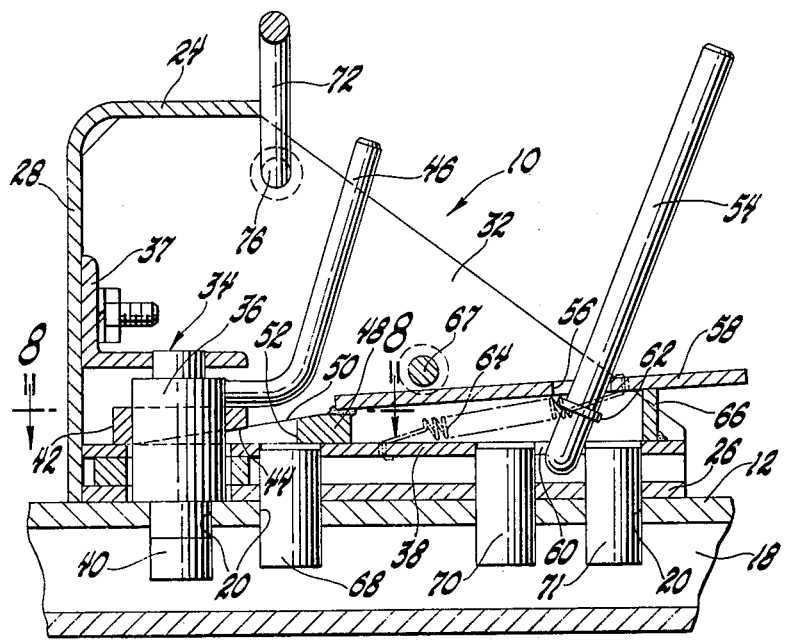
FIG. 4 is a view similar to that seen in FIG. 3 with the lock head and wedge member repositioned.
Figure 6:
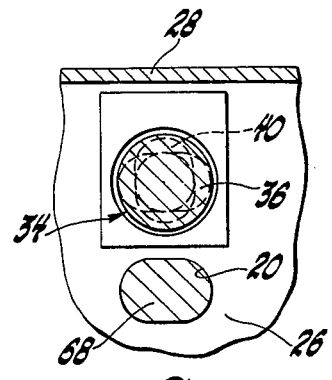
Figure 7:
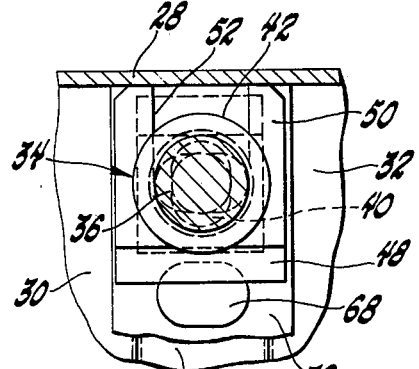
Figure 8:
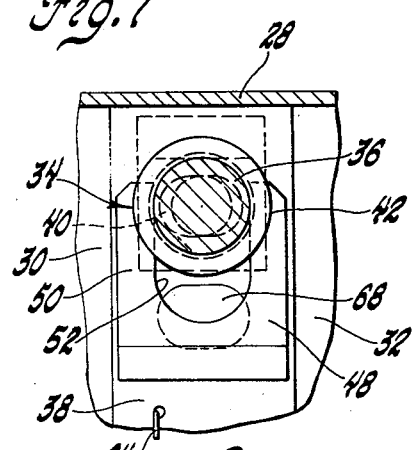

FIGS. 6 and 7 are sectional views taken on line 6—6 and line 7—7, respectively, of FIG. 3; and FIG. 8 is a sectional view taken on line 8—8 of FIG. 4.

Figure 1:
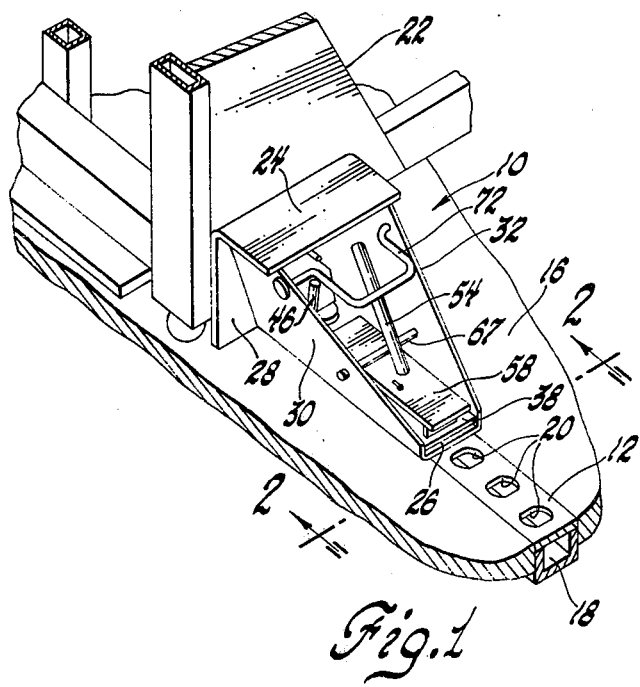
FIG. 1 is a perspective view showing a chock device made in accordance with the invention and connected to the floor portion of a transporter.

Referring to the drawings and more particularly FIG. 1 thereof, a chock device 10 made in accordance with the invention is shown overlying an elongated bar 12 which extends parallel to the longitudinal axis of a railway freight car and is located along one side thereof. The side edges of the bar 12 are rigidly secured to the floor portion 16 of the freight car above an elongated channel 18 formed in the floor portion so as to provide an open space beneath the bar 12. In addition, the bar 12 is formed with a plurality of equally spaced and identical elliptical holes 20 which are aligned along the longitudinal center axis of the bar 12. The chock device 10 is adapted to cooperate with the bar 12 for restraining from movement cargo such as a parts container 22 carried within the freight car. It will be understood that another bar, such as the bar indicated by reference numeral 12, is positioned in the floor portion 16 of the freight car along the other side thereof. It is quite common to have such bars fixed with the floor portion of freight cars with each of the bars extending the full length of the car.

Figure 2:
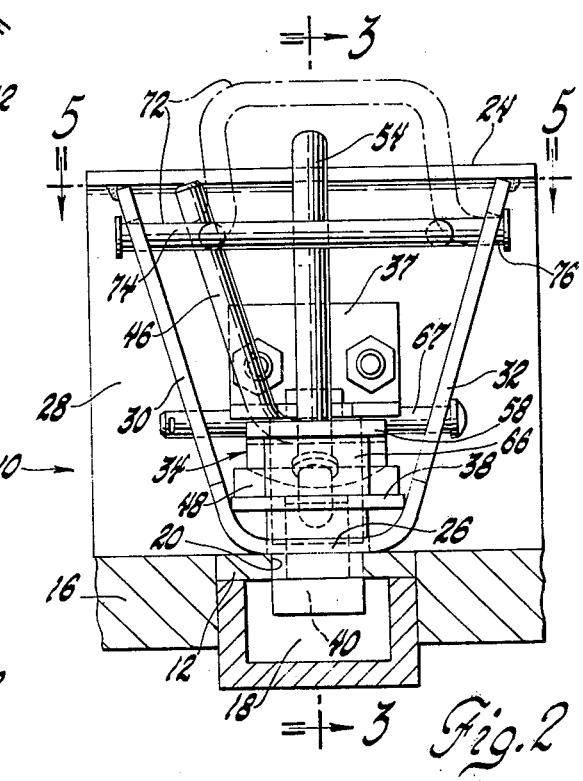
FIG. 2 is an enlarged view of the chock device taken on lines 2—2 of FIG. 1.

As seen in FIGS. 2 and 3, the chock device 10 comprises a body portion which includes upper and lower horizontal members 24 and 26, respectively, the former of which is integrally formed with an upright front wall member 28. In addition, the body portion includes a pair of laterally spaced and diverging triangular side walls 30 and 32 which are integral with the lower horizontal member 24 and serve to rigidly interconnect the upper horizontal member 26 and the front wall member 28. Centrally located between the side walls 30 and 32 is a lock member 34 which includes a vertically oriented cylindrical pin 36, the upper end of which is reduced in diameter and rotatably journalled within an L-shaped support bracket 37 fixed with the front wall member 28. The lower end of the pin 36 extends through vertically aligned openings provided in a rectangular plate member 38 and the lower horizontal member 26 and is formed with a lock head 40 which is elliptical in configuration and substantially corresponds in shape and size when viewed in cross section with each of the holes 20 formed in the bar 12. An upper portion of the pin 36 is rigidly connected with and supports a cam member 42 which is shaped as a ring and has an inclined flat cam surface 44 at its lower end. An L-shaped lever 46 has its lower end fixed with the pin 36 above the cam member 46 and extends outwardly and upwardly therefrom.

A wedge member 48 is located below the cam member 42 and also has an inclined flat surface 50 which cooperates with the cam surface 44 of the cam member 42 for raising and lowering the lock member 34. In this case, the wedge member 48 has an inclined angle that measured approximately 8.6 degrees. Also, as seen in FIG. 8, the wedge member 48 has a U-shaped slot 52 centrally formed therein along its longitudinal axis for accomodating the pin 36. Thus, the slot 52 allows the wedge member to move axially between the position shown in FIG. 3 wherein the surface 50 cooperates with the cam surface 44 to locate the lock member 34 in the raised position and the position shown in FIG. 4 wherein the aforesaid surfaces cooperate to locate the lock member 34 in the lowered position.

The axial sliding movement of the wedge member 48 is realized by movement of a lever 54 between the position shown in FIG. 3 and the position shown in FIG. 4. In this regard, it will be noted that the lower portion of the lever 54 extends through an oblong slot 56 in a plate 58 the front end of which is rigidly secured to the rear edge of the wedge member 48. Also, the lower end of the lever 54 is located within an opening 60 in plate member 38 that is of a size slightly less than the size of a ring 62 secured to the lever. In addition, a spring 64 has one end secured to the plate 58 and the other end secured to the plate member 38. It will also be noted that the lower rear portion of the plate 58 rests upon a vertical support 66 fixed with the rear end of the plate member 38, and the plate 58 is prevented from raising upwardly by a transverse pin 67 which extends between side walls 30 and 32. Thus, when the lever 54 is pulled rearwardly from the FIG. 3 position to the FIG. 4 position, the plate 58 is drawn rearwardly in a confined path against the bias of spring 64.

As seen in FIG. 3, the horizontal member 26 and the plate 38 rigidly support three stud members or projections 68, 70 and 71 which are identical in size and conform in cross sectional shape and size with each of the holes 20 in the bar 12. Each of the projections 68, 70 and 71 extend the same distance beyond the lower surface of the horizontal member 26, and the spacing between the center of each projection 70 and 71 as well as the spacing between the center of lock head 40 and the center of projection 68 is the same as the spacing between the centers of adjacent holes 20 in the bar 12.

Figure 5:
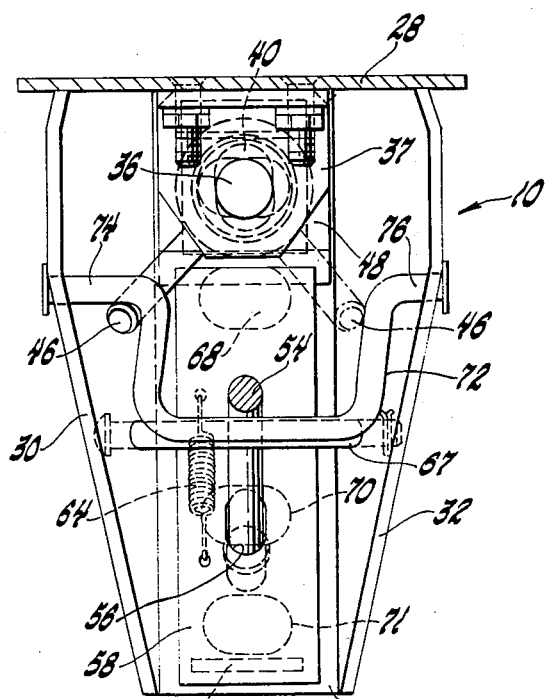
FIG. 5 is a top view of the chock device taken on line 5—5 of FIG. 2.

It should be apparent from the above description that when the chock device 10 is used as a stop member for preventing movement of cargo in a transporter, it is placed over the bar 12 with the projections 68, 70 and 71 and the lock head 40 extending through accommodating holes 20 in the bar 12 as seen in FIG. 4. During such time, the lock head 40 is located with its major axis extending transversely to the longitudinal axis of the chock device 10 as seen in FIG. 4 so that the lock head 40 can be inserted through one of the holes 20 in the bar 12. This transverse positioning of the lock head 40 from the FIG. 3 position is realized by first moving lever 54 to the FIG. 4 position so as to retract wedge member 48 followed by manually grasping the lever 46 and rotating the latter counterclockwise as seen in FIG. 5 approximately 90° so the lever 46 is located in the phantom line position. When this is done, the lock head 40 drops by gravity downwardly relative to the lower horizontal member 26 to the position shown in FIG. 4.

After the lock head 40 and the projections 68, 70 and 71 are located within the accommodating holes 20 of the bar 12 as seen in FIG. 4 with the upright member 28 engaging the parts container 22, the lever 46 is returned to the full line position of FIG. 4 and the lever 54 is released so that the spring urged wedge member 48 causes the lock member 34 to move upwardly to the raised position of FIG. 3. As a result, the lock head 40 provides firm engagement between the lock head 40 and the lower surface of the bar 12, and the chock device 10 is locked to the bar 12.

It should be noted that once the chock device 10 is in locked relationship with the bar 12 as seen in FIGS. 2 and 3, a U-shaped lever 72 can be pivoted downwardly from the phantom line position to the full line position into a blocking position relative to the levers 46 and 54 so as to prevent the latter from moving from the full line positions. As seen in FIG. 5, the lever 72 is formed with oppositely extending arms 74 and 76 of unequal length that are rotatably supported in the side walls 30 and 32 respectively. This arrangement allows the afore-mentioned blocking action to occur. Moreover, the lever 72 is designed so it can also serve as a handle for moving the chock device 10 from one location to another.

After the freight car reaches its destination and it is desired to remove the parts container 22 from the freight car, the chock device 10 can be released from the bar 12 by initially returning the lock lever 72 to the raised phantom line position of FIG. 3 after which the lever 54 is moved rearwardly to the full line position of FIG. 4. It will be noted that if difficulty is encountered in moving the lever 54 rearwardly to release the lock member 34, the plate 58 is designed to allow sidewise movement of the rear portion thereof by moving the top of the lever 54 sidewise between the side walls 30 and 32. This sidewise movement will cause the wedge member 48 to pivot about the center of pin 36 and help break any binding forces which might be acting between the surfaces 44 and 50 as a result of the rack shifting against the upright member 28 of the chock device 10 and causing the lock head 40 to apply a relatively large load to the underside of the bar 12. As should be apparent when the wedge member 48 is shifted rearwardly from the cam member 42 and is in the FIG. 4 position, the lock head 40 will drop by gravity to the position of FIG. 4 after which the lever 46 is moved to the phantom line position of FIG. 5 so as to once again position the major axis of the lock head 40 in line with the major axis of the accommodating hole 20 so that the entire chock device 10 can be removed from the bar 12.

Various changes and modifications can be made in this construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A chock device adapted to be fixedly connected to an elongated bar secured to the floor portion of a transporter for preventing cargo from shifting while the transporter is moving, said elongated bar being formed with a plurality of equally spaced oblong holes along its longitudinal length, said chock device comprising a body portion including an upright member for engaging the cargo and a rigidly connected horizontal member for overlying the elongated bar, at least one projection fixed to said horizontal member and having a configuration which allows said projection to be located within one of said oblong holes and substantially fill the latter, a rotatable lock head extending through said horizontal member and adapted to register with and be located in another of said holes in said elongated bar when the horizontal member overlies said elongated bar, said lock head having an elliptical shape which allows the lock head to pass through said another of said holes in said bar when the lock head is in one position and prevents said lock head from being removed from said elongated bar when said lock head is rotated to a second position, a manually operable lever for rotating said lock head between said first and second positions, a wedge supported by said body portion for raising said lock head towards said horizontal member so when said lock head is in said another of said holes and is located in said second position the lock head serves to maintain said body portion in firm contact with said elongated bar, spring means continuously urging said wedge towards said lock head, and means connected to the wedge for manually releasing said wedge from engagement with the lock head against the bias of the spring means so as to facilitate removal of said chock device from said elongated bar.

2. A chock device adapted to be fixedly connected to an elongated bar secured to the floor portion of a transporter for preventing cargo from shifting while the transporter is moving, said elongated bar being formed with a plurality of equally spaced oblong holes along its longitudinal length, said chock device comprising a body portion including an upright member for engaging the cargo and a rigidly connected horizontal member for overlying the elongated bar, at least one projection fixed to said horizontal member and having a configuration which allows said projection to be located within one of said oblong holes and substantially fill the latter, a rotatable lock head extending through said horizontal member and adapted to register with and be located in another of said holes in said elongated bar when the horizontal member overlies said elongated bar, said lock head having an elliptical shape which allows the lock head to pass through said another of said holes in said bar when the lock head is in one position and prevents said lock head to be removed from said elongated bar when said lock head is rotated to a second position, a manually operable lever fixed with said lock head for rotating the latter between said first and second positions, a wedge supported for sliding movement above said horizontal member for raising said lock head towards said horizontal member so when said lock head is in said another of said holes and is located in said second position the lock head serves to maintain said body portion in firm contact with said elongated bar, spring means continuously urging said wedge towards said lock head, and a lever means connected to the wedge and supported at one end by said body portion above said horizontal member, said lever means adapted to be moved along the longitudinal axis of the chock device and along an axis extending transversely thereto for manually releasing said wedge from engagement with the lock head against the bias of the spring means so as to facilitate removal of said chock device from said elongated bar.

3. A chock device adapted to be fixedly connected to an elongated bar secured to the floor portion of a transporter for preventing cargo from shifting while the transporter is moving, said elongated bar being formed with a plurality of equally spaced oblong holes along its longitudinal length, said chock device comprising a body portion including an upright member for engaging the cargo and a rigidly connected horizontal member for overlying the elongated bar, a pair of laterally spaced side walls rigidly connected to said horizontal member, at least one projection fixed to said horizontal member and having a configuration which allows said projection to be located within one of said oblong holes and substantially fill the latter, a rotatable lock head extending through said horizontal member and adapted to register with and be located in another of said holes in said elongated bar when the horizontal member overlies said elongated bar, said lock head having an elliptical shape which allows the lock head to pass through said another of said holes in said bar when the lock head is in one position and prevents the lock head from being removed from said elongated bar when said lock head is rotated to a second position, a manually operable lever for rotating said lock head between said first and second positions, a wedge supported for sliding movement above said horizontal member for raising said lock head towards said horizontal member so when said lock head is in said another of said holes and is located in said second position the lock head serves to maintain said body portion in firm contact with said elongated bar, spring means continuously urging said wedge towards said lock head, lever means connected to the wedge for manually releasing said wedge from engagement with the lock head against the bias of the spring means so as to facilitate removal of said chock device from said elongated bar, and a U-shaped handle pivotally mounted between said side walls and adapted to be moved from a raised position to a lowered position for blocking movement of said lever means so as to prevent release of said wedge from engagement with the lock head.

* * * * *